United States Patent [19]

Danielson et al.

[11] Patent Number: 5,240,980
[45] Date of Patent: Aug. 31, 1993

[54] COLORANTS FOR USE IN OPACIFIED THERMOPLASTIC RESINS

[75] Inventors: Todd D. Danielson; David J. Moody; John W. Rekers, all of Spartanburg, S.C.

[73] Assignee: Milliken Research Corporation, Spartanburg, S.C.

[21] Appl. No.: 890,353

[22] Filed: May 22, 1992

Related U.S. Application Data

[63] Continuation of Ser. No. 652,589, Feb. 8, 1991, abandoned.

[51] Int. Cl.5 .......................... C08K 5/23; C08K 3/26; C08K 3/22; D06P 3/00
[52] U.S. Cl. ........................................ 524/190; 524/83; 524/84; 524/87; 524/88; 524/159; 524/167; 524/420; 524/423; 524/425; 524/445; 524/497; 524/583; 524/585; 8/403; 8/506
[58] Field of Search ............... 524/420, 423, 425, 445, 524/497, 83, 84, 87, 88, 159, 190, 430, 403, 506, 167, 583, 585

[56] References Cited

U.S. PATENT DOCUMENTS

| | | | |
|---|---|---|---|
| 3,669,922 | 6/1972 | Bartsch et al. | 524/88 |
| 4,209,430 | 6/1980 | Weber | 524/487 |
| 4,594,221 | 6/1986 | Mohnhaupt et al. | 524/497 |
| 4,732,570 | 3/1988 | Baumgartner et al. | 524/83 |
| 4,758,396 | 7/1988 | Crass et al. | 524/487 |
| 4,978,362 | 12/1990 | Kluger et al. | 524/83 |

*Primary Examiner*—Paul R. Michl
*Assistant Examiner*—Tae H. Yoon
*Attorney, Agent, or Firm*—Timothy J. Monahan; Terry T. Moyer

[57] ABSTRACT

An opacified, semi-crystalline thermoplastic resin composition is provided having a poly(alkyleneoxy) substituted organic chromophore distributed throughout in an amount sufficient to color the resin. The resin composition is particularly useful for molding parts with strict dimensional tolerances as shrinkage of the molded part is minimal.

20 Claims, No Drawings

COLORANTS FOR USE IN OPACIFIED THERMOPLASTIC RESINS

The application is a continuation of application Ser. No. 652,589, filed Feb. 8, 1991, now abandoned.

BACKGROUND OF THE INVENTION

1. Field of the Invention

This invention relates generally to the use of a colorant having a poly(alkyleneoxy) substituent to color thermoplastic resins containing an opacifier. In particular, the colorant may be incorporated with an opacifier into a semi-crystalline resin which can then be manufactured to close dimensional tolerances without experiencing shrinkage or warpage attributable to the colorant

2. Prior Art

Traditionally, pigments have been incorporated into thermoplastic resins, such as alpha-olefins, to impart color to the resin. Pigments offer the features of low cost, availability in a wide range of hues and exceptional lightfastness. However, at typical color loadings, pigments tend to opacify thermoplastic resins, which may be undesirable for some applications. Recent developments in clarifiers for thermoplastic resins, such as the dibenzylidene sorbitols disclosed in Hamada, et al., U.S. Pat. No. 4,016,118, have expanded the market for resin colorants which do not detract from the transparency of the final product. It has been found that thermoplastic resins colored with poly(alkyleneoxy) substituted chromophores show improved clarity over those colored with pigments. The use of poly(alkyleneoxy) substituted chromophores to color resins is disclosed in Baumgartner et al , U.S. Pat. No. 4,640,690 and Baumgartner et al., U.S. Pat. No. 4,732,570. In addition to providing coloration without sacrificing clarity, the aforementioned colorants demonstrate low extractability and migration as well as processing advantages due to their availability in liquid form at ambient temperatures.

Despite the advantages of employing poly(alkyleneoxy) substituted colorants in thermoplastic resin systems, their expense has limited their use to applications in which a premium is placed on the clarity of the final product. For example, in applications such as overcaps, threaded and snap-on lids, referred to generally as closures, opacifiers are incorporated into the resins, primarily for aesthetic reasons. Since the clarity of the final formed product is not pertinent when opacifiers are employed, pigments have been universally used to color closures.

Closures are often required to meet strict dimensional tolerances, especially when the closures contain moving parts such as may be used on shampoo or dish detergent bottles. One of the difficulties of manufacturing parts from thermoplastic resins has been the tendency of the resin to shrink or warp following formation of the part. Shrinkage is believed to be caused in part by the presence of pigments which act as nucleating agents in resins which are semi-crystalline upon cooling. The affect on nucleation of phthalocyanine pigments is disclosed in Gilbert et al., U.S. Pat. No. 3,558,551. While the effect of shrinkage can be compensated for by using a slightly larger mold or different machine set-up, the shrinkage attributable to the pigment may vary from one color of pigment to the next. Consequently, it may be very difficult for a parts manufacturer to provide an entire color line of opacified closures without having to change the molding equipment with each change in pigment.

SUMMARY OF THE INVENTION

Therefore, an object of the invention is to provide colorants for thermoplastic resins which either have no effect on shrinkage of the parts or tend to cause the parts to shrink uniformally. Another object of the invention is to provide a colored, opacified thermoplastic resin which is especially useful to manufacture parts within strict tolerances. A still further object is to provide a semi-crystalline thermoplastic resin useful to manufacture colored, opacified closures.

The advantages of this invention include uniform shrinkage of products formed from the resin composition over an entire line of poly(alkyleneoxy) substituted colorants, non-nucleation of the thermoplastic resin by the colorants and compatibility of the colorants in an opacified resin composition. The colorants are particularly beneficial for use in semi-crystalline, thermoplastic resins susceptible to nucleation.

Accordingly, a thermoplastic resin composition is provided having an opacifier and a poly(alkyleneoxy) substituted colorant incorporated therein. The opacifier is added in sufficient quantity to opacify the resin composition, typically in concentrations of 0.01 to 2.0 wt. % of the composition. Examples of suitable opacifiers include titanium dioxide, zinc sulfide, barium sulfate, calcium carbonate and clay. The colorants are organic chromophores which have poly(alkyleneoxy) substituents of sufficient character and molecular weight to substantially limit the extractability of the colorant from the resin composition. The invention is applicable to a wide variety of thermoplastic resins, particularly those which undergo significant shrinkage and warpage in the presence of nucleating agents subsequent to the resin being molded. Thermoplastic resins of particular interest are semi-crystalline, especially alpha-olefin homopolymers and copolymers of ethylene, propylene and butylene.

DESCRIPTION OF THE PREFERRED EMBODIMENT OF THE INVENTION

Without limiting the scope of the invention, the preferred features of the invention are hereinafter set forth.

The present invention is a resin composition having incorporated therein an opacifier and a colorant having a poly(alkyleneoxy) substituent. Resins useful in the invention are thermoplastic, they have the property of softening of fusing when heated and of hardening again when cooled. Of particular interest are thermoplastic resins which are semi-crystalline. The term "semi-crystalline" resins is intended to encompass resins which form small crystalline bodies or aggregates, such as spherulites, upon solidification, including those resins which form crystalline bodies in the presence of a nucleating agent.

Examples of thermoplastic resins which may be employed include homopolymers, and block and random copolymers and terpolymers of ethylene, propylene and butylene, especially alpha-olefins such as high density polyethylene, linear low density polyethylene and polypropylene. Resins useful herein also include polyethylene terephthalate, polyamides such as nylon 6 and nylon 66, ethyl vinyl acetate and thermoplastic ionomers.

The resin composition has an opacifier incorporated therein in an amount sufficient to opacify the resin. The opacifier may be any of those well known in the art characterized as a finely divided inorganic particulate. Typical opacifiers have an average particle size of less 5 microns, preferably less than 1 micron. Examples of opacifiers include titanium dioxide, zinc sulfide, barium sulfate, calcium carbonate and clay, with titanium dioxide and zinc sulfide being preferred. The opacifier is distributed throughout the resin composition in concentrations of from about 0.01 to 2 wt. %, preferably from 0.05 to 1 wt. %.

The colorant is poly(alkyleneoxy) substituted organic chromophore. The chromophore is attached to the poly(alkyleneoxy) substituent through a suitable linking group such as a nitrogen, oxygen, sulfur, sulfonamido or sulfonyl group. Examples of chromophore groups are nitroso, nitro, azo, diarymethane, triarylmethane, xanthene, acridene, quinoline, methine, thiazole, indamine, indophenol, lactone, aminoketone, hydroxyketone, stilbene, azine, oxazine, thiazine, anthraquinone, phthalocyanine, and indigoid chromophores. Particularly useful in the resin composition are colorants made from azo, methine, anthraquinone and phthalocyanine chromophores.

The poly(alkyleneoxy) substituent of the colorant is a polymer primarily comprised of alkyleneoxide residues having from 2 to 4 carbon atoms. Typical of such poly(alkyleneoxy) groups are the polymeric epoxides including homopolymers, block and random copolymers made from ethylene oxide, propylene oxide, butylene oxide and glycidol. Enhanced branching of the polymeric chain may be accomplished by reacting glycidol into the chain. More uniform branching may be achieved by reacting the primary hydroxyl of the glycidol residue with a secondary hydroxyl forming epoxide, such as propylene oxide or butylene oxide, prior to the addition of ethylene oxide to the chain. Suitable poly(alkyleneoxy) substituents may have a molecular weight of from about 132 to 10,000, preferably from about 176 to 5,000.

Alternatively, the poly(alkyleneoxy) substituent may be characterized as being comprised of monomer residues selected from compounds of the formula $(-CH_2CH(R)O-)$ where R is selected from $-H$, $-CH_3$, $-CH_2CH_3$ and $-CH_2O-$. Of course, the colorant may contain more than one poly(alkyleneoxy) substituent attached to a chromophore, such as when nitrogen is the linking group. The total number of said monomer residues per colorant molecule is typically from 3 to 400, preferably from about 10 to 200. It has been found that the colorant performs best with regard to extractability and migration when at least 75% of the monomer residues comprising the poly(alkyleneoxy) substituent are ethylene oxide and propylene oxide residues, with ethylene oxide residues being most preferred. The poly(alkyleneoxy) substituent may contain minor amounts of other monomer residues without deviating from the scope of the invention. However, monomers which significantly increase the solubility of the colorant in the thermoplastic resin should be avoided.

Polymers of alkylene oxides may be purchased and reacted with a chromophore or chromophore intermediate to obtain the desired colorant. Commercially available amines from which the present colorants may be prepared are the JEFFAMINE series described in Texaco Chemical Company, New Product Development brochures as the M, D, ED, DU, BUD, T, MNPA; and EDR series.

It is to be understood that because the colorants may not ordinarily be chemically bound to the thermoplastic polymer, the precise chemical identity of the end group on the polyalkyleneoxy group may not be critical insofar as the proper functioning of the colorant is concerned in the composition. With this consideration in mind certain most preferred colorants will be defined where certain end groups will be identified. Such recitation of end groups is not to be construed as limiting the invention in its broader embodiments in any way. According to such a most preferred embodiment the colorants may be characterized as follows:

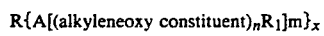

R{A[(alkyleneoxy constituent)$_n$R$_1$]m}$_x$ wherein R—A is an organic chromophore group, A is a linking moiety in said organic chromophore group selected from the group consisting of N, O, S, $CO_2$, $SO_2$ and sulfonamido groups, the alkylene moiety of the alkyleneoxy constituent contains from 2 to about 4 carbon atoms, n is an integer of from 2 to about 230, m is 1 when A is O, S, $CO_2$ and $SO_2$ and sulfonamido and 1 or 2 when A is N, x is an integer of from 1 to 5, and the product of n times x times m (n.m.x) is from 2 to about 230, and $R_1$ is a member of the group consisting of

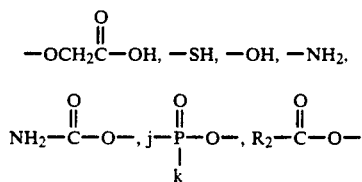

and sulfonates and sulfates of each of the members of said group, wherein $R_2$ is H, an alkyl radical containing up to about 20 carbon atoms or carboxy-terminated alkyl radical containing up to about 20 carbon atoms, j and k are OHm OM or OR, wherein M is a cation moiety of an alkali metal, an alkaline earth metal, transition metal, e.g., nickel, etc. or ammonium, and R, is an alkyl radical containing up to about 20 carbon atoms.

Colorants of the general type useful in the present resin composition have found use in the past as fugitive tints as disclosed in U.S. Pat. No. 3,157,663 to Kuhn (incorporated by reference). Other colorants which may be employed according to the present invention include the alkaline-stable colorants of the triphenylmethane type as described in U.S. Pat. No. 3,927,044 (incorporated by reference).

Yet another category of colorants which may be employed in the composition and process of the present invention are the ester capped polyalkyleneoxy colorants disclosed in U.S. Pat. No. 4,167,510 (incorporated by reference). Such colorants comprise an organic chromophore group having from 1 to 5 capped polyalkyleneoxy units wherein the total alkyleneoxy units in the molecule are from 2 to about 300. The alkylene moiety of the polyalkyleneoxy units contains from 2 to about 4 carbon atoms. The properties of the colorants may be varied depending upon the particular capping moiety employed, the presence or absence of at least one ionic group and the total number of alkyleneoxy units present in the colorant.

Still another category of colorants which may be employed according to the present invention includes those disclosed in U.S. Pat. No, 4,400,320, Keller, et al. (incorporated by reference). Such colorants may be characterized by the formula:

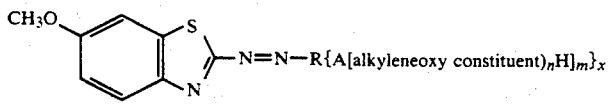

wherein R is selected from meta-toluidine, meta-aminophenol, aniline or dimethoxyaniline; A is selected from N, O, S, CO$_2$, SO$_2$ and sulfonamido groups; the alkylene group of the alkyleneoxy constituent contains from 2 to about 4 carbon atoms; n is an integer of from 2 to about 300; m is 1 when A is O, S, CO$_2$, SO$_2$ and sulfonamido, and 2 when A is N; x is an integer of from 1 to about 5; and the product of n.m.x is from 2 to about 400.

The colorants may be employed in the thermoplastic resins in a minor amount sufficient to provide the desired degree of coloration in the resin. The actual amount used will, in addition to the desired depth of shade, depend upon the tinctorial strength of the chromophore used and the overall molecular weight of the colorant, e.g., chromophore plus polyalkyleneoxy chain length. Typically, the amount of colorant employed may be from about 0.0001 percent to about 5 percent, preferably from about 0.001 percent to about 3 percent, by weight based upon the overall weight of the resin composition.

Other conventional additives may also be present in the resin compositions of the present invention. For instance, such additives may include plasticizers, antioxidants, stabilizers, lubricants, flame retardants, nucleating agents and other additives which will be readily identified by those skilled in the art. In general, the colorants have been observed to have little or no adverse interactions with these conventional additives.

Any suitable procedure may be employed to produce the colorants of the invention whereby the polyalkyleneoxy group, or groups, are coupled to a chromophore group. For example, the procedure set forth in U.S. Pat. No. 3,157,663, hereby incorporated by reference, may be employed. The particular shade of the colorant will depend primarily upon the particular chromophore group selected. A large variety of colors and shades may be obtained by lending two or more colorants. Blending of the colorants of the present invention can be readily accomplished as the colorants are polymeric materials which may have substantially identical solubility characteristics, which are dictated by the nature of the polymeric chain. Therefore, the colorants are in general soluble in one another, and are also in general completely compatible with each other.

For example, the colorants of the invention may be prepared by converting a dyestuff intermediate containing a primary amino group into the corresponding polymeric compound and employing the resulting compound to produce a compound having a chromophoric group in the molecule. In the case of azo colorants, this may be accomplished by reacting a primary aromatic amine with an appropriate amount of an alkylene oxide or mixture of alkylene oxides, such as ethylene oxide, propylene oxide, or even butylene oxide, according to procedures well known in the art, and then coupling the resulting compound with a diazonium salt of an aromatic amine. In order to prepare colorants of the triarylmethane class, aromatic amines that have been reacted as state above with an alkylene oxide are condensed with aromatic aldehydes and the resulting condensation products are oxidized to form the triarylmethane colorants. While azo, methine, triarylmethane and anthraquinone colorants are preferred because of their ease of preparation and brilliance of color as well as the multitude of shades available, many other colorants may be prepared by known procedures.

The disclosure in Baumgartner et al., U.S. Pat. No. 4,640,690, incorporated by reference, provides additional examples of methods of manufacturing the colorants of interest herein and methods of incorporating the colorants into a thermoplastic resin.

The resin composition is made by incorporating the opacifier and colorant into a preformed thermoplastic resin. In a preferred embodiment, the opacifier and colorant are distributed throughout the resin as distinguished from a topical application to an article made from the solidified resin. In other words, the term "distributed" is intended to include those instances where the colorant and opacifier are enveloped in the resin rather than adhered or bound to the outer surface of a product made from the resin. The colorant need not be homogeneously distributed in the resin and certain aesthetically pleasing effects may be created when the colorant appears in streaks in the resin. In fact, the colorant offers the benefit of not causing differential shrinkage of the resin even when it is not homogeneously distributed therein.

The opacifier and colorant may be incorporated into the resin while the resin is in a molten state. Techniques such as first mixing a batch of pre-extruded resin pellets or resin powder, opacifier particulates and liquid colorant followed by extrusion of the mixture, are well known in the art. Alternatively, a concentrate of approximately 10 wt. % of the colorant only in the resin may be produced by extruding the resin and colorant. The concentrate in the form of pellets may then be extruded with the desired amount of uncolored resin pellets and opacifier to make a product with the desired color strength. It is also within the scope of the invention to mix the colorant with a suitable solvent or dispersing agent prior to incorporation of the colorant into the resin thus providing certain processing advantages.

Incorporation of the opacifier and colorant into the resin need not be limited to extrusion. Any method for blending the opacifier, colorant and resin while the resin is in a molten or plasticized state is acceptable such as prior to or during formation of the resin into its final shape by molding or blow-molding. Details about these procedures may be found in the relevant literature.

The resin composition of the present invention has the advantage of allowing a manufacturer of formed plastic parts, such as closures, to run an entire color line without shrinkage of the parts varying from one colorant to the next. The following examples compare opacified, thermoplastic resins colored with poly(alkyleneoxy) substituted colorants with identical resins colored with pigments. Unless otherwise indicated, the parts and percentages are by weight. The pigments selected for comparison testing were listed in the 1990 Chemical Economics Handbook as being commonly used to color polypropylene. Representative pigments are set forth in Table 1 below.

TABLE 1

| PIGMENT | COLOR | SUPPLIER | TRADE NAME |
|---|---|---|---|
| Phthalo | Blue | BASF | Heliogen K6902 |
| Red 2B | Red | BASF | Lithol NBK 4451 |
| Perylene | Red | BASF | Paliogen K3911HD |
| Diarylide | Yellow | BASF | Sico Fast NBK1265 |

The structures of the colorants of the present invention which were used in the testing are set forth below. The symbols EO and PO designate ethylene oxide and propylene oxide residues, respectively.

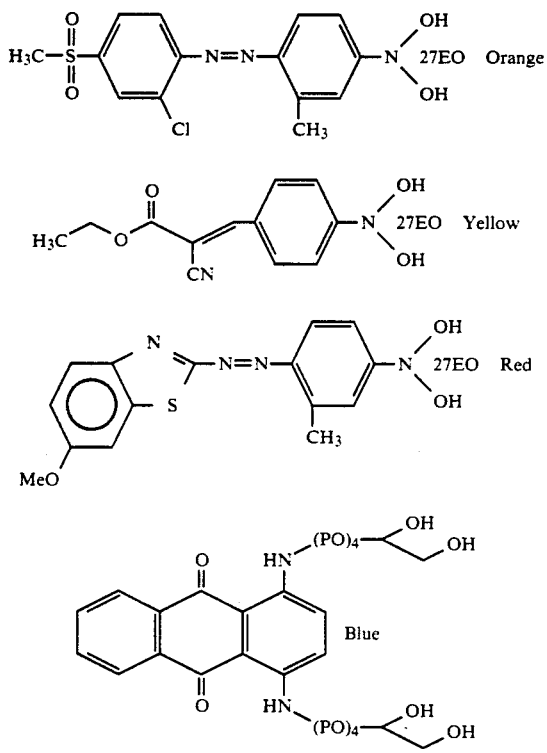

EXAMPLE 1

Formulations of colorants of the present invention, designated polymeric colorants, and pigments were prepared in Himont 6301, homopolymer polypropylene. The concentration of the pigments in the resin was set as 3000 ppm. The concentration of the polymeric colorant in the resin was based on that needed to match the color value of the corresponding pigment colored resin. Slightly more than 3000 ppm polymeric colorant is generally necessary to match the color value of a pigment as compensation for the poly(alkyleneoxy) substituent.

Pigments:
3.0 g BASF Heliogen Blue K6902
0.5 g Irgaphox 168
1.0 g Irganox 1010
0.5 g Calcium stearate
4.0 g 50% Titanium dioxide concentrate
991.0 g Himont 6301 PP Likewise, samples were formulated substituting equal weights of BASF Paliogen Red K3911HD, BASF Sico Fast Yellow NBK1265 and BASF Scarlet NBK4451 for the blue pigment.

Polymeric colorant:

30.0 g 10% Polymeric Blue conc. in PP
0.5 g Irgaphox 168
1.0 g Irganox 1010
0.5 g Calcium stearate
4.0 g 50% Titanium dioxide concentrate
946.0 g Himont 6301 PP Likewise, samples were formulated substituting equal weights of 10% concentrates of Polymeric Red, Yellow and Orange for the blue polymeric colorant.

Each of the above eight formulations was extruded on a C.W. Brabender extruder, Type EPL-V5501, or Killion extruder Model KLB-100. Thirty tensil bars were molded for each of the eight samples using an Arburg Allrounder 25 ton injection molder, Model No. 221-55-250 at 205° C. and again at 260° C. Shrinkage was measured lengthwise immediately after extrusion and again seven days later following the guidelines of ASTM Test Method D955-88.

The crystallization temperature of each of the eight formulations was measured by differential scanning calorimetry. The effect of nucleation on shrinkage and peak crystallization temperature are presented below in TABLE 2.

TABLE 2

| SAMPLE | SHRINKAGE INCH/INCH | PEAK DSC |
|---|---|---|
| POLYMERIC COLORANT INJECTION MOLDED AT 205° C. | | |
| Yellow | 0.02292 | 103.5 |
| Orange | 0.02342 | 103.9 |
| Red | 0.02293 | 104.0 |
| Blue | 0.02316 | 103.0 |
| POLYMERIC COLORANT INJECTION MOLDED AT 260° C. | | |
| Yellow | 0.02171 | 103.5 |
| Orange | 0.02236 | 103.9 |
| Red | 0.02171 | 104.0 |
| Blue | 0.02217 | 103.0 |
| PIGMENT INJECTION MOLDED AT 205° C. | | |
| Yellow | 0.02475 | 118.9 |
| Red | 0.02190 | 109.0 |
| Scarlet | 0.02600 | 111.8 |
| Blue | 0.02338 | 116.3 |
| PIGMENT INJECTION MOLDED AT 260° C. | | |
| Yellow | 0.02510 | 118.9 |
| Red | 0.02203 | 109.0 |
| Scarlet | 0.02639 | 111.8 |
| Blue | 0.02390 | 116.3 |

EXAMPLE 2

Formulations of polymeric colorants and pigments were prepared in Dow 8354 high density polyethylene. Again, the concentration of the pigments in the resin was set at 3,000 ppm. Polymeric colorant was added to the resin in the form of a ten percent (10%) concentrate in low density polyethylene.

Pigments:
3.0 g BASF Heliogen Blue K6902
0.5 g Calcium stearate
4.0 g 50% Titanium dioxide concentrate
992.5 g Dow 8354 High Density Polyethylene Likewise, samples were formulated substituting equal weights of BASF Paliogen Red K3911HD, BASF Sico Fast Yellow NBK1265 and BASF Scarlet NBK4451 for the blue pigment.

Polymeric colorant:

30.0 g 10% Polymeric Blue conc. in LDPE
0.5 g Calcium stearite
4.0 g 50% Titanium dioxide concentrate
965.5 g Dow 8354 High Density Polyethylene Likewise, samples were formulated substituting equal weights of 10% concentrates of Polymeric Red, Yellow and Orange for the blue polymeric colorant.

Thirty tensil bars of each of the formulations of Example 2 were extruded and the shrinkage was measured according to the procedures in Example 1. Additionally, differential scanning calorimetry data was used to determine the peak crystallization temperature for each of the eight samples. The results are given below in TABLE 3.

TABLE 3

| SAMPLE | SHRINKAGE INCH/INCH | PEAK DSC |
|---|---|---|
| POLYMERIC COLORANT INJECTION MOLDED AT 205° C. | | |
| Yellow | 0.03291 | 104.7 |
| Orange | 0.03339 | 103.7 |
| Red | 0.03237 | 105.5 |
| Blue | 0.03229 | 106.7 |
| POLYMERIC COLORANT INJECTION MOLDED AT 260° C. | | |
| Yellow | 0.03438 | 104.7 |
| Orange | 0.03200 | 103.7 |
| Red | 0.03209 | 105.5 |
| Blue | 0.03211 | 106.7 |
| PIGMENT INJECTION MOLDED AT 205° C. | | |
| Yellow | 0.01489 | 106.0 |

TABLE 3-continued

| SAMPLE | SHRINKAGE INCH/INCH | PEAK DSC |
|---|---|---|
| Red | 0.03322 | 104.5 |
| Scarlet | 0.03282 | 101.5 |
| Blue | 0.05048 | 105.6 |
| PIGMENT INJECTION MOLDED AT 260° C. | | |
| Yellow | 0.03135 | 106.0 |
| Red | 0.03225 | 104.5 |
| Scarlet | 0.03079 | 101.5 |
| Blue | 0.05288 | 105.6 |

EXAMPLE 3

Differential Scanning Calorimetry analysis was performed on various samples of opacified resin compositions colored with pigments or polymeric colorants. The pigments were selected from the 1990 Chemical Economics Handbook as being the ones commonly used to color polypropylene. In addition to the polymeric colorants allready disclosed, a phthalocyanine based polymeric colorant having the following structure was also tested.

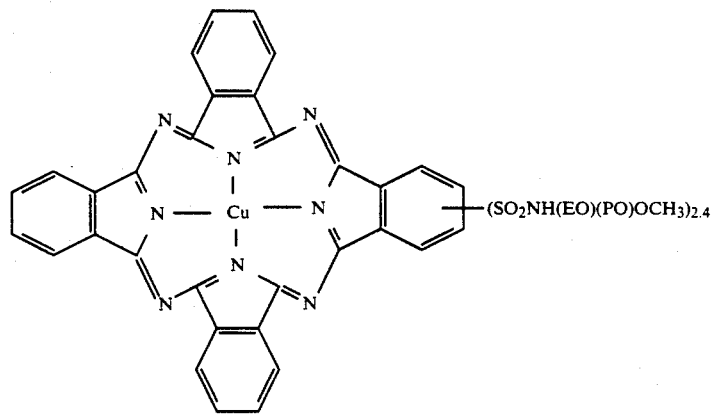

Exxon 9142 G, a random copolymer, containing 0.2 wt. % titanium dioxide was colored with 1000 and 3000 ppm of the pigment and an equivalent color strength of polymeric colorant which was a slightly higher concentration than the pigment. Samples were run on Differential Scanning Calorimetry at 20.0 C/minute ramp under nitrogen. The results for the 1000 ppm and ppm color concentration samples are set forth below in Tables 4 and 5, respectively.

TABLE 4

| PIGMENT | Trade Name | T1 (C) | T2 (C) | PEAK | ONSET |
|---|---|---|---|---|---|
| BASF Green | Heliogen K9360 | 108.7 | 86.7 | 99.5 | 105.0 |
| BASF Yell SF | Sico Fast K1761 | 110.1 | 86.9 | 100.8 | 107.0 |
| BASF Yell Pa | Paliotol K1841 | 101.1 | 82.7 | 91.3 | 96.7 |
| BASF Red Pa | Paliogen K3911HD | 102.3 | 82.9 | 93.9 | 98.0 |
| BASF Red Li | Lithol NBK 4451 | 102.5 | 82.9 | 95.2 | 100.2 |
| BASF Blue | Heliogen K6902 | 110.5 | 94.7 | 103.6 | 108.1 |
| SAN Yell 4G | Sandorin 4G | 104.9 | 86.9 | 97.6 | 102.6 |
| SAN Yell G | Sandorin G | 105.7 | 90.7 | 98.5 | 103.1 |
| SAN Orange | Graphtol GPS | 100.2 | 81.7 | 92.4 | 97.6 |
| SAN Vio 2R | Sandorin 2R | 108.7 | 94.5 | 102.2 | 106.6 |
| SAN Vio BL | Sandorin BL | 110.3 | 90.7 | 101.7 | 106.6 |
| SAN Blue | Estofil S-RLS | 100.3 | 82.9 | 90.8 | 96.7 |
| Polym. Cyan | 8723-63A | 98.5 | 75.1 | 88.4 | 95.9 |
| Polym. Blue | 8723-64A | 98.5 | 75.1 | 87.7 | 95.4 |
| Polym. Orange | 8723-61A | 98.5 | 82.9 | 90.2 | 96.1 |
| Polym. Red | 8723-62A | 96.7 | 75.1 | 87.4 | 95.2 |

TABLE 4-continued

| PIGMENT | Trade Name | T1 (C) | T2 (C) | PEAK | ONSET |
|---|---|---|---|---|---|
| Polym. Yellow | 8723-60A | 97.3 | 79.1 | 88.8 | 95.5 |

Average (Polymeric) 88.5 (1.1)
Average (Pigment) 97.3 (4.5)

TABLE 5

| PIGMENT | Trade Name | T1 (C) | T2 (C) | PEAK | ONSET |
|---|---|---|---|---|---|
| BASF Green | Heliogen K9360 | 108.7 | 94.1 | 102.5 | 107.6 |
| BASF Yell SF | Sico Fast K1761 | 110.1 | 90.7 | 102.2 | 108.4 |
| BASF Yell Pa | Paliotol K1841 | 98.51 | 75.1 | 89.9 | 96.1 |
| BASF Red Pa | Paliogen K3911HD | 101.0 | 79.1 | 93.0 | 98.5 |
| BASF Red Li | Lithol NBK 4451 | 104.9 | 79.7 | 94.4 | 101.8 |
| BASF Blue | Heliogen K6902 | 110.3 | 94.3 | 104.5 | 109.0 |
| SAN Yell 4G | Sandorin 4G | 104.9 | 83.1 | 97.4 | 103.1 |
| SAN Yell G | Sandorin G | 106.3 | 90.7 | 98.5 | 103.2 |
| SAN Orange | Graphtol GPS | 101.1 | 79.3 | 93.4 | 99.2 |
| SAN Vio 2R | Sandorin 2R | 110.3 | 90.7 | 102.7 | 107.3 |
| SAN Vio BL | Sandorin BL | 110.3 | 90.7 | 102.2 | 107.8 |
| SAN Blue | Estofil SRLS | 98.5 | 75.1 | 89.3 | 96.3 |
| Polym. Cyan | 8723-63D | 96.5 | 75.1 | 88.7 | 95.7 |
| Polym. Blue | 8723-64D | 95.7 | 75.1 | 88.0 | 94.5 |
| Polym. Red | 8723-62D | 96.7 | 75.1 | 87.5 | 95.5 |
| Polym. Orange | 8723-61D | 98.5 | 75.1 | 88.0 | 95.6 |
| Polym. Yellow | 8723-60D | 98.7 | 75.1 | 87.9 | 95.8 |

Average (Polymeric) 88.0 (0.4)
Average (Pigment) 97.5 (5.4)

EXAMPLE 6

A sample of Exxon 9142 G with 1.0% titanium dioxide was compared to a sample without titanium dioxide to see if titanium dioxide is a significant nucleating agent. Using Differential Scanning Calorimetry, the sample with titanium dioxide showed a peak crystallization temperature of 89 C. while the one without had a peak crystallization temperature of 88 C. The above example demonstrates that titanium dioxide is at most a very weak nucleator at the concentration ranges used in the present resin composition.

The foregoing comparative examples of opacified resins colored with pigments and polymeric colorants indicate that pigments are nucleators and that there is substantial variation in the nucleation effect amoung the most commonly used pigments. Additionally, a strong correlation was found between nucleation of the thermoplastic resin by the pigment and shrinkage of the resin composition.

There are, of course, many alternate embodiments and modifications of the invention which are intended to be included within the scope of the following claims.

What we claim is:

1. A resin composition comprising a semi-crystalline, thermoplastic resin having distributed throughout an inorganic opacifier in a concentration of from 0.01 to 2.0 wt. % of said composition and a poly(alkyleneoxy) substituted chromophore colorant in a concentration of from 0.001 to 3.0 wt. % of said composition, whereby said colorant is essentially non-extractable from said resin.

2. A composition according to claim 1 wherein said poly(alkyleneoxy) substituent of said colorant is a polymer comprised of alkyleneoxide residues having from 2 to 4 carbon atoms and wherein an average molecular weight of said poly(alkyleneoxy) substituent is from 132 to 10,000.

3. A resin composition according to claim 2 wherein said chromophore group of said colorant is selected from nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine, and indigoid chromophores.

4. A resin composition according to claim 3 wherein said resin is selected from homopolymers, and block and random copolymers and terpolymers of ethylene, propylene and butylene.

5. A resin composition according to claim 4 wherein said opacifier is selected from titanium dioxide, zinc sulfide, barium sulfate, calcium carbonate and clay.

6. A resin composition according to claim 2 wherein said opacifier is selected from titanium dioxide, zinc sulfide, barium sulfate, calcium carbonate and clay.

7. A resin composition according to claim 6 wherein said chromophore is selected from azo, methine, anthraquinone and phthalocyanine chromophores.

8. A resin composition according to claim 7 wherein said resin is selected from homopolymers, and block and random copolymers and terpolymers of ethylene, propylene and butylene.

9. A resin composition according to claim 2 wherein said opacifier is titanium dioxide in a concentration of from 0.05 to 1.0 wt. % of said composition.

10. A resin composition according to claim 9 wherein said chromophore is selected from azo, methine, anthraquinone and phthalocyanine chromophores.

11. A resin composition according to claim 10 wherein said resin is selected from homopolymers, and block and random copolymers and terpolymers of ethylene, propylene and butylene.

12. A resin composition comprising a semi-crystalline, thermoplastic resin having distributed throughout an inorganic opacifier in an amount sufficient to opacify said composition and a poly(alkyleneoxy) substituted organic chromophore colorant in an amount of from 0.001 to 3.0 wt. % of said composition, wherein said poly(alkyleneoxy) substituent is comprised of monomer residues selected from the formula ($-CH_2CH(R)O-$) where R is selected from $-H$, $-CH_3$, $-CH_2CH_3$ and $-CH_2O-$ and the total number of said monomer residues per colorant molecule is from 10 to 400.

13. A resin composition according to claim 12 wherein said opacifier is selected from titanium dioxide, zinc sulfide, barium sulfate, calcium carbonate and clay, said opacifier comprising from 0.01 to 2.0 wt. % of said composition.

14. A resin composition according to claim 13 wherein said resin is selected from homopolymers, and block and random copolymers and terpolymers of ethylene, propylene and butylene.

15. A resin composition according to claim 14 wherein at least 75% of said monomer residues in said poly(alkyleneoxy) substituent are selected from ($-CH_2CH_2O-$) and ($-CH_2CH(CH_3)O-$).

16. A resin composition according to claim 15 wherein said organic chromophore group is selected from azo, methine, anthraquinone and phthalocyanine chromophores and said resin is selected from homopolymers, and block and random copolymers and terpolymers of ethylene, propylene and butylene.

17. A process for manufacturing parts from a semicrystalline, thermoplastic resin composition having from 0.01 to 2.0 wt. % of an inorganic opacifier incorporated therein, wherein said parts are to be manufactured in at least two different colors, an improvement comprising providing a first opacified resin composition which has been colored by incorporating therein from 0.001 to 3.0 wt. % of a colorant selected from poly(alkyleneoxy) substituted chromophores to produce a desired first shade of color, and further providing a second opacified resin composition which has been colored by incorporating therein from 0.001 to 3.0 wt. % of a colorant selected from poly(alkyleneoxy) substituted chromophores to produce a desired second shade of color, said first and second shades of color being different, and whereby said colorant is essentially nonextractable from said first and second resin compositions, said thermoplastic resin is selected from homopolymers, and block and random copolymers and terpolymers of ethylene, propylene and butylene.

18. A process according to claim 17 wherein said opacifier is selected from titanium dioxide, zinc sulfide, barium sulfate, calcium carbonate and clay.

19. A process according to claim 18 wherein said wherein a concentration of said opacifier in said first and second resin composition is the same.

20. A process according to claim 18 wherein said poly(alkyleneoxy) substituent of said colorant is a polymer comprised of alkyleneoxide residues having from 2 to 4 carbon atoms and wherein an average molecular weight of said poly(alkyleneoxy) substituent is from 132 to 10,000.

* * * * *